United States Patent [19]
Kuo

[11] Patent Number: 5,988,503
[45] Date of Patent: Nov. 23, 1999

[54] ANTI-COUNTERFEIT CARD AND METHOD FOR MANUFACTURING THE CARD

[76] Inventor: Weiwu A. Kuo, 7 Wickland, Irvine, Calif. 92720

[21] Appl. No.: 08/902,984

[22] Filed: Jul. 30, 1997

[51] Int. Cl.$^6$ .............................. G06K 7/10; B42D 15/00
[52] U.S. Cl. ............................................. 235/457; 283/86
[58] Field of Search ................................ 235/457, 458, 235/488; 283/86, 901, 902, 904

[56] References Cited

U.S. PATENT DOCUMENTS

| | | | |
|---|---|---|---|
| 3,994,225 | 11/1976 | Sitzberger | 101/426 |
| 4,560,426 | 12/1985 | Moraw et al. | 156/64 |
| 4,631,222 | 12/1986 | Sander | 428/172 |
| 4,641,017 | 2/1987 | Lopata | 235/437 |
| 4,684,795 | 8/1987 | Colgate, Jr. | 235/457 |
| 4,945,215 | 7/1990 | Fukushima et al. | 235/457 |
| 5,138,604 | 8/1992 | Umeda et al. | 369/103 |
| 5,383,687 | 1/1995 | Suess et al. | 283/86 |
| 5,421,618 | 6/1995 | Kazaki et al. | 283/82 |
| 5,700,550 | 12/1997 | Uyama et al. | 428/212 |
| 5,720,500 | 2/1998 | Okazaki et al. | 283/82 |

*Primary Examiner*—Thien Mink Le
*Assistant Examiner*—Daniel Sherr
*Attorney, Agent, or Firm*—W. Wayne Liauh

[57] ABSTRACT

An anti-counterfeit card includes a substrate on which an anti-counterfeit membrane is attached. The substrate includes a sheet of plastic with two transparent surface layers formed on two opposite sides thereof. Printing may be selectively carried out on the two sides of the plastic sheet and the outer surfaces of the surface layers. The anti-counterfeit membrane includes a hologram film on which serration defining a hologram is formed so as to make it difficult to counterfeit the card. A method for manufacturing the anti-counterfeit card is also disclosed. A method for manufacturing the anti-counterfeit card is also disclosed, comprising the steps of providing a substrate; providing an anti-counterfeit membrane which comprises a hologram film; and attaching the anti-counterfeit membrane to the substrate to form the anti-counterfeit card.

9 Claims, 13 Drawing Sheets

ANTI-COUNTERFEIT CARD AND METHOD FOR MANUFACTURING THE CARD

FIELD OF THE INVENTION

The present invention relates generally to a card structure, such as an identification card, and in particular to a card structure that incorporates a hologram for anti-counterfeit purpose. The present invention also relates to a method for making the anti-counterfeit card.

BACKGROUND OF THE INVENTION

With the development of human society and civilization, commercial and industrial activities are significantly increased and the modern people enjoy all kinds of services from the society and businesses. The personal identification is very important to identify the person who is to enjoy or use the services, for example, an access card for entry to a particular building or a restricted area, or a driver's license or other picture IDs. Conventionally, the identification card is protected by a transparent plastic cover which is adhesively or tightly attached to the card and once the transparent cover is peeled, the card is damaged. This achieves certain effect in preventing duplication or counterfeit of the identification card. However, since such a plastic cover itself is not provided within means for anti-counterfeit, it is still likely to be counterfeited. It is thus desired to have an anti-counterfeit card structure which itself is difficult to be counterfeited so as to reduce the likelihood of counterfeit of the card.

Thus it is desirable to have an anti-counterfeit card structure which itself is difficult to counterfeit so as to have an improved effectiveness of anti-counterfeit of the identification card.

OBJECTS OF THE INVENTION

Therefore, an object of the present invention is to provide an anti-counterfeit card which has a protective film or membrane fixed on a surface thereof, the protective film itself being difficult to counterfeit so as to be more effective in preventing the card from counterfeit.

Another object of the present invention is to provide an anti-counterfeit card which incorporates therein a hologram so as to be capable to prevent counterfeit of the card due to the difficult in duplicating the hologram.

A further object of the present invention is to provide an anti-counterfeit card which is cheap and effective.

Yet a further object of the present invention is to provide anti-counterfeit card on which a hologram is attached to generate stereo holographic image for aesthetic purpose.

Also, a method for manufacturing the anti-counterfeit card with a hologram fixed thereon is provided by the present invention.

To achieve the above and other objects, there is provided an anti-counterfeit card comprising a substrate on which an anti-counterfeit membrane is attached. The substrate comprises a sheet of plastic with two transparent surface layers formed on two opposite sides thereof. Printing may be selectively carried out on the two sides of the plastic sheet and the outer surfaces of the surface layers. The anti-counterfeit membrane comprises a hologram film on which serration defining a hologram is formed so as to make it difficult to counterfeit the card.

Also disclosed herein is a method for manufacturing the anti-counterfeit card, comprising the steps of providing a substrate; providing an anti-counterfeit membrane which comprises a hologram film; and attaching the anti-counterfeit membrane to the substrate to form the anti-counterfeit card.

BRIEF DESCRIPTION OF THE DRAWINGS

The present invention will be better understood from the following description of preferred embodiments thereof, which is illustrative and not limitative, with reference to the attached drawings, wherein.

DETAILED DESCRIPTION OF THE PREFERRED EMBODIMENTS

With reference to the drawings and in particular to FIGS. 1–13, wherein the manufacturing steps for making an anti-counterfeit card in accordance with a first embodiment of the present invention is shown, the anti-counterfeit card in accordance with the first embodiment of the present invention comprises a substrate 10 (see FIGS. 7–9), which is a thin plate of a suitable thickness, such as card board or a sheet of plastic, on which printing may be done in regular way. The substrate 10 has a surface on which an anti-counterfeit membrane 12 (see FIG. 12) is attached with any suitable known manner.

Figure 1:
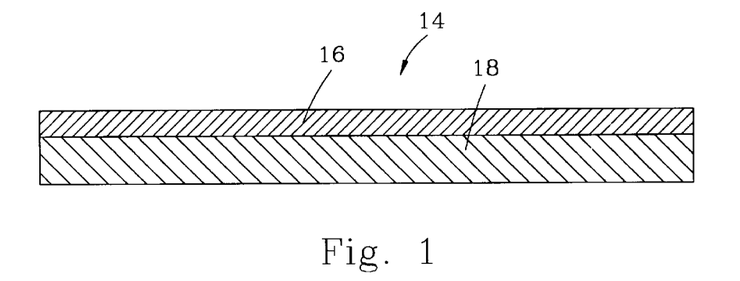
FIG. 1 is a cross-sectional view showing a base layer of an anti-counterfeit membrane to be attached to a substrate to form an anti-counterfeit card in accordance with a first embodiment of the present invention.

In accordance with the present invention, the anti-counterfeit membrane 12 comprises a layer of base material 14, which comprises for example plastics having a desired width and length. The base material 14 may simply comprise a single sheet of plastic material 16, such as polyethylene terephthalate (PET) or alternatively, as shown in FIG. 1, a layer of a slipping agent 18 may be added on the PET layer 16. The slipping agent layer 18 is to facilitate a mechanized handling operation of the anti-counterfeit membrane 12. Practically, the anti-counterfeit membrane 12 may be made in advance as an elongated strip with a substantial length and wound as a roll (not shown) to facilitate storage, transportation and use thereof. The slipping agent layer 18 may constitute one side of the semi-finished product of the anti-counterfeit membrane 12 to facilitate machine handling and to protect the membrane 12 from being scratched and damaged.

Figure 2:
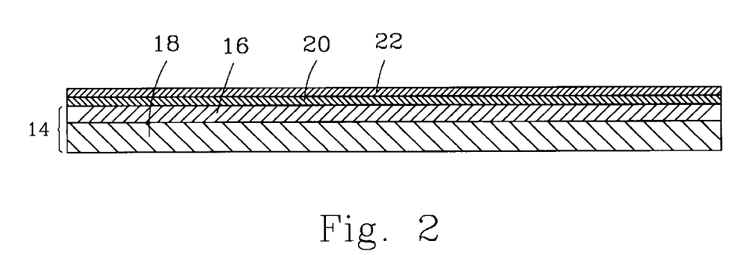
FIG. 2 is a cross-sectional view showing the base layer of the anti-counterfeit membrane is sequentially coated with a first and as second layers of release.
Figure 3:
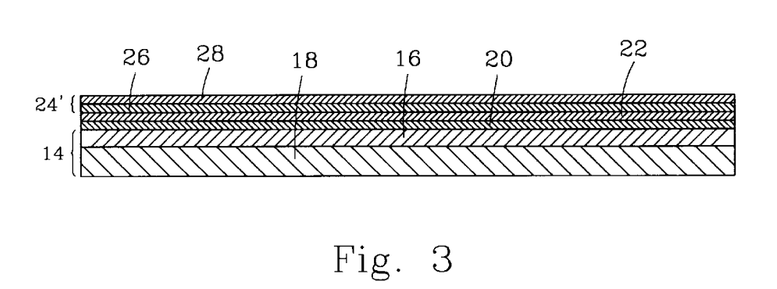
FIG. 3 is a cross-sectional view showing the structure of FIG. 2 having a plain film structure for forming of a hologram film provided thereon.

On one side of the plastic layer 16 of the base 14, a first layer of release 20 and a second layer of release 22 are coated in sequence, as shown in FIG. 2. In accordance with the present invention, the first release may comprise for example wax-based material, while the second release comprises for example cellulose material. Thereafter, as shown in FIG. 3, a hologram film 24 (see FIG. 4) is attached to the second release layer 22. The hologram film 24 comprises a resin-based primer layer 26 and a transparent coating layer 28. The formation of the hologram film 24 is done by first applying the primer 26 onto the second release layer 22 and coating the transparent layer 28 thereon by means of for example vacuum deposition or electroplating. As shown in FIG. 3, initially, the two layers 26 and 28 are flat and have a plain surface which is distinguishingly labeled with reference numeral 24' that represents a film structure on which a serration defining a hologram interference pattern has not yet been formed. In accordance with the present invention, the transparent layer 28 may be formed with any suitable material, including metallic and non-metallic materials. For those materials that are conductive, electroplating is an effective way to form the transparent layer 28 and for those non-conductive materials, vacuum deposition or similar technique may be adapted. The term "transparent coating" used herein is intended to indicate a layer of material which allows a major portion of an incident light to transmit therethrough with only a minor portion reflected and not necessarily, but preferably, a material that allows a total transmission of the incident light. An example of the "transparent layer" or "transparent coating" is a glass coating.

Figure 4:
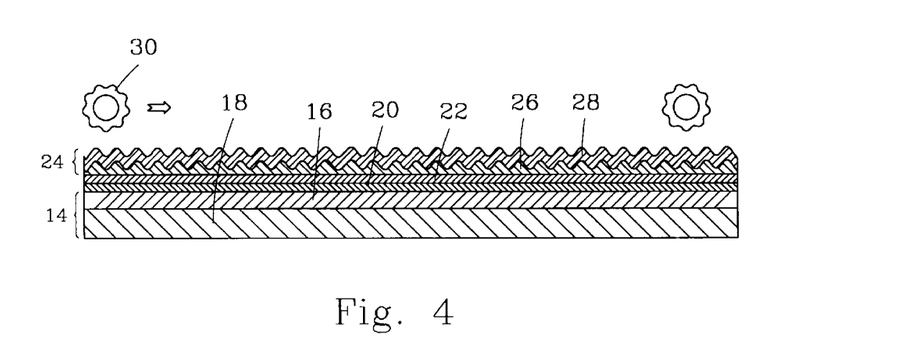
FIG. 4 is a cross-sectional view showing the anti-counterfeit membrane constructed in accordance with the first embodiment of the present invention.

Thereafter, as shown in FIG. 4, a roller 30 having an outer surface on which a serrated pattern is formed and exactly complementary to the serration defining the hologram on the film 24 is driven to roll over the plain film structure 24' to form the hologram serration on the film structure 24' so as to make the hologram film 24.

Figure 5:
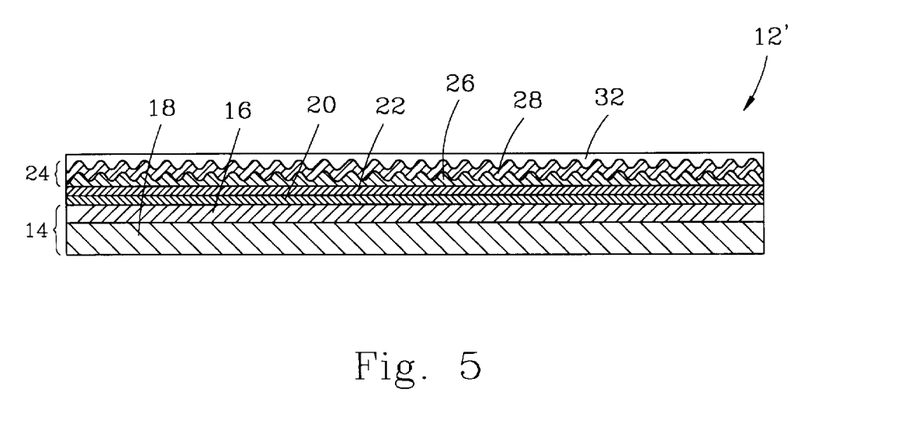
FIG. 5 a cross-sectional view showing the anti-counterfeit membrane having an adhesive layer coated thereon.
Figure 11:
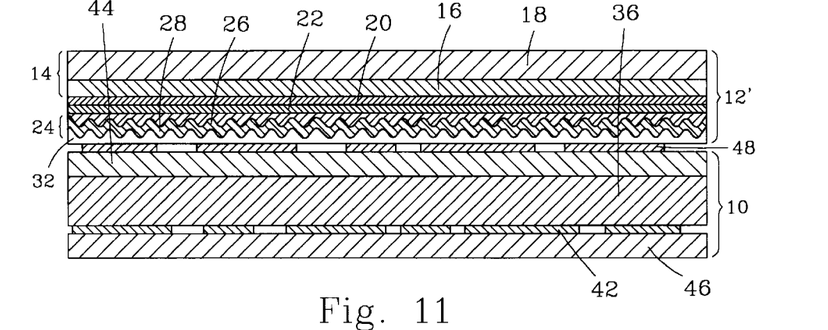
FIG. 11 is a cross-sectional view showing the anti-counterfeit card in accordance with the first embodiment of the present invention with the base layer of the anti-counterfeit membrane not yet been removed.

An adhesive 32 is then applied onto the serrated outer surface of the hologram film 24, as shown in FIG. 5. The adhesive 32 fills into the serration of the hologram film 24 and forms an adhesive surface to be attached to the surface of the substrate 10, as shown in FIG. 11. This forms an intermediate protective structure 12' to be further processed in order to finally make the protective anti-counterfeit membrane 12, see FIG. 12.

Figure 6:
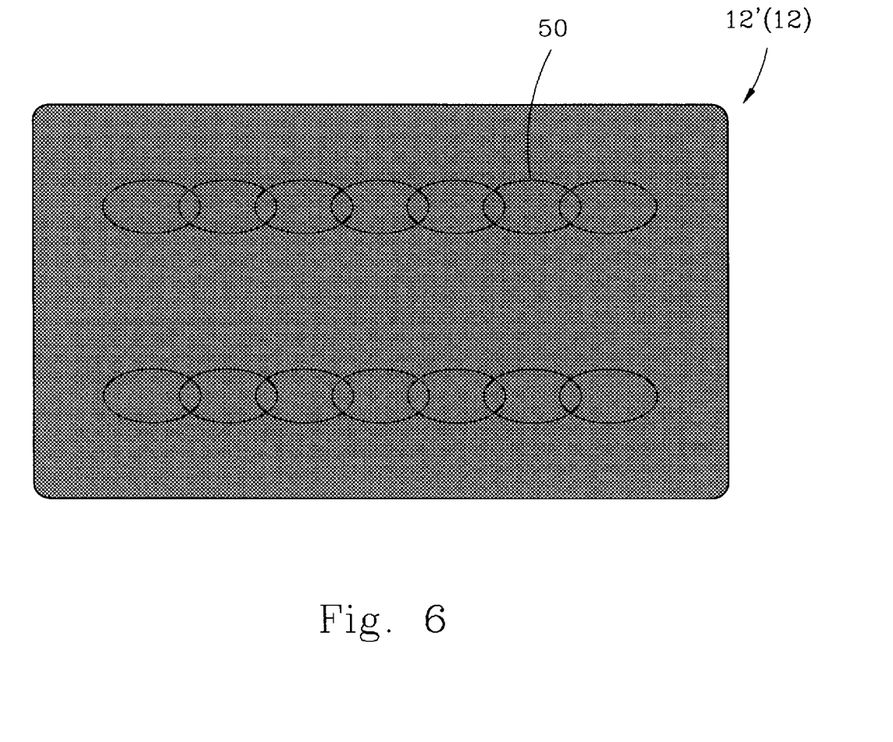
FIG. 6 is a plan view of the structure on FIG. 5, showing the holographic image re-constructed by the hologram film.

The intermediate protective structure 12' so formed comprises the hologram film 24 therein which has hologram interference pattern or serration to re-construct a stereo holographic image 50, as indicated in FIG. 6, which may provide an effect similar to a water mark that is commonly seen in paper sheets.

Figure 7:
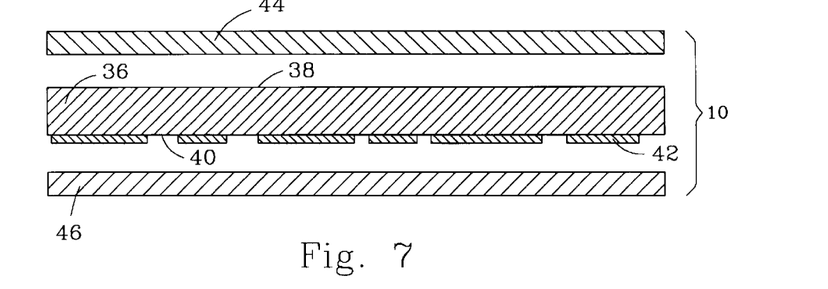
FIG. 7 is an exploded, cross-sectional view showing the substrate in accordance with the first embodiment of the present invention.
Figure 8:
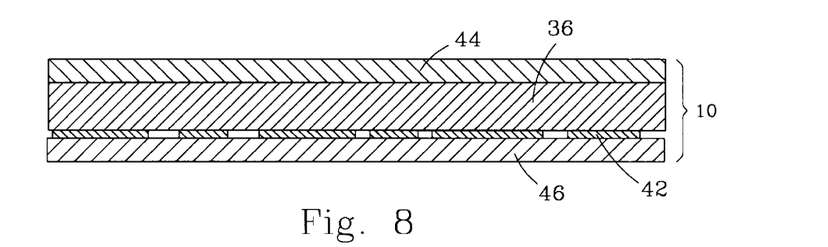
FIG. 8 is a cross-sectional view showing the substrate of the first embodiment of the present invention.
Figure 9:
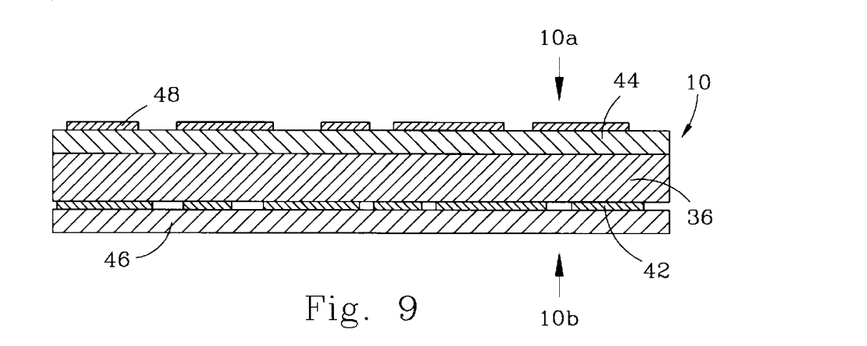
FIG. 9 is a cross-sectional view showing a second set of prints provided on the outer surface of the surface layer of the substrate of the first embodiment of the present invention.
Figure 10A:
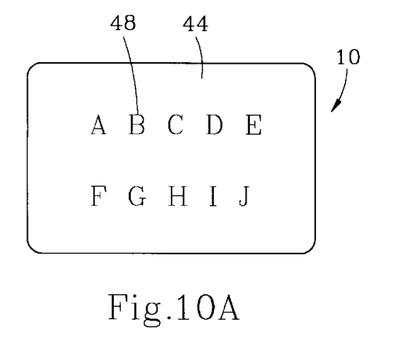
FIGS. 10a and 10b are plain views taken along arrows 10a and 10b of FIG. 9.
Figure 10B:
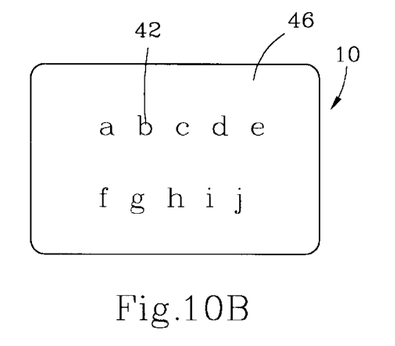

As shown in FIGS. 7–9, the substrate 10 comprises a core layer 36 which may comprise metallic or non-metallic materials having a sufficient rigidity to serve as a card, having a first surface 38 and an opposite second surface 40. In the embodiment illustrated, the core layer 36 is made of a sheet of plastic material having a suitable thickness, such as a sheet of polyvinyl chloride (PVC) with a thickness of 500 microns. Preferably, the PVC sheet is white so as to facilitate printing operation on the surface 38 and/or 40 thereof. In FIG. 7, a first set of prints 42 which may include character, marks or the like are printed on the second surface 40 of the core layer 36 which as shown in FIG. 10b comprise several small English letters as a demonstration example. Quite obviously, the first set of prints 42 may comprise any information or logos that are desired to be shown thereon. For example, in case the card is to be used as a personal ID for entry to an office, the information 42 printed on the card may comprise the employee's general regulation of using the card. The small English letters used herein is just a demonstration of the printing operation done thereon.

On each of the first and second surfaces 38 and 40 of the core layer 36, a first transparent surface layer 44 and a second surface layer 46 are respectively attached to substantially cover the first surface 38 and the second surface 40 of the core layer 36. This completes the making of the substrate 10, as shown in FIG. 8. The first and second surface layers 44 and 46 may both made of transparent plastics, such as transparent PVC, having a thickness of for example 250 microns. Thus, in accordance with this example, the total thickness of the substrate 10 is 1,000 microns.

Furthermore, as shown in FIG. 9, if desired, a second set of prints 48, including characters, marks or the like, may be printed on the outer surface of either one of the first surface layer 44 and the second surface layer 46. In the embodiment illustrated, the second set of prints 48 are provided on the first surface layer 44, as shown in FIG. 9. To demonstrate, in FIG. 10a, the second set of prints 48 are shown as capital English letters as an example. The second set of prints 48 may be for example the card owner's name and picture and so on. FIGS. 10a and 10b respectively show the views taken along the arrows 10a and 10b in FIG. 9.

In accordance with the present invention, in manufacturing, the first surface layer 44 and the second surface layer 46 are attached and fixed to the first surface 38 and the second surface 40 of the core layer 36 by heating and pressurizing. In a mass production, a plurality of pieces of the substrate 10 (the core layer 36 and the first and second surface layers 44 and 46) may stacked over each other and pressurized at the same time with a single pressurizing device acting at the uppermost and the lowermost ones of the pieces of the substrate of the stack while being heated. This significantly heightens the manufacturing efficiency. Preferably, the second sect of prints 48 that are provided on the outer surface of either one of the first surface layer 44 and the second surface layer 46 are printed after the heating and pressurizing operation is finished in order to prevent the prints 48 from being damaged during the heating and pressurizing operation.

The substrate 10 so formed may then be adhesively attached to the intermediate protective structure 12' of the anti-counterfeit membrane 12 by bringing the adhesive layer 32 of the intermediate protective structure 12' into contact with the either one of the first surface layer 44 and the second surface layer 46 of the substrate 10. Alternatively, if desired, both the first and second surface layers 44 and 46 may have a respective intermediate protective structure 12' attached thereto. In the embodiment illustrated, only one single intermediate protective structure 12' is attached to the first surface layer 44 of the substrate 10, covering the second set of prints 48 on the outer surface of the first surface layer 44, as shown in FIG. 11. It should be noted that since the intermediate protective structure 12' is fixed to the substrate 10 by having the adhesive layer 32 thereof in contact engagement with the first surface layer 44 of the substrate 10, the intermediate protective structure 12' in FIG. 11 is positioned up side down as compared with that in FIG. 5.

Figure 12:
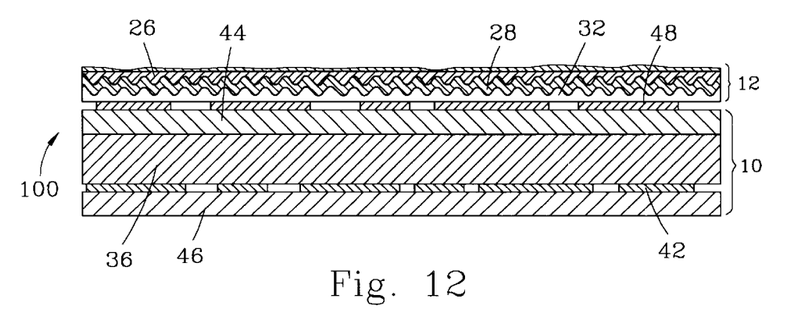
FIG. 12 is a cross-sectional view of the anti-counterfeit card of FIG. 11 with the base layer removed.

Thereafter, as shown in FIG. 12, the base layer 14 of the intermediate protective structure 12', including the plastic layer 16 and the slipping agent layer 18, is detached from the intermediate protective structure 12' by peeling along either one of the first release layer 20 and the second release layer 22 (which is the second release layer 22 in the embodiment illustrated). The anti-counterfeit card in accordance with the first embodiment of the present invention is thus completed, which is designated at 100 in FIGS. 12 and 13. With the base layer 14 removed, the intermediate protective structure 12' forms the anti-counterfeit membrane 12 of the anti-counterfeit card 100 of the present invention, see FIG. 12.

Figure 13:
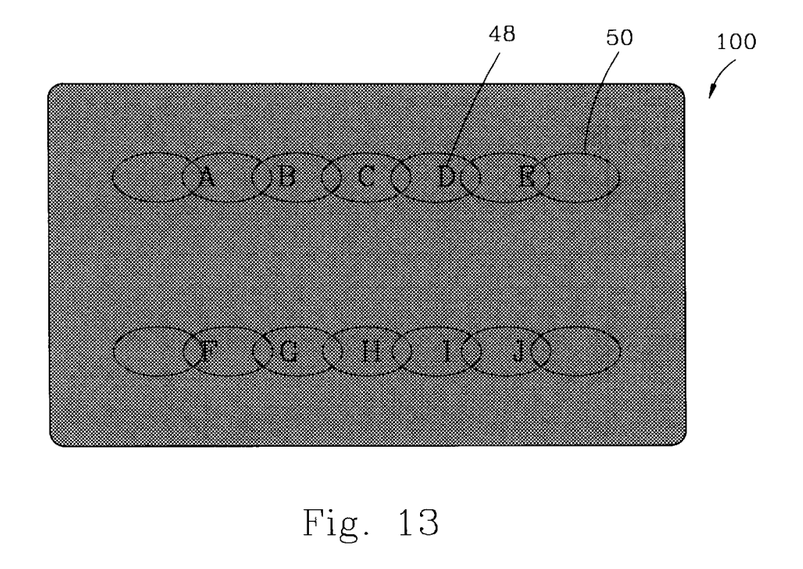
FIG. 13 is a plan view of anti-counterfeit card in accordance with the first embodiment of the present invention.

Due to the hologram serration in the hologram film 24, the anti-counterfeit card 100 of the present invention shows a stereo holographic image when viewed from one side thereof, as shown in FIG. 13 and indicated at 50. The holographic image 50 is shown at the same side (the first surface 38 or the first surface layer 44) of the substrate 10 of the card 100 as the second set of prints 48 as shown in FIG. 13, while the other side (the second surface 40) is illustrated in FIG. 10B.

Figure 14:
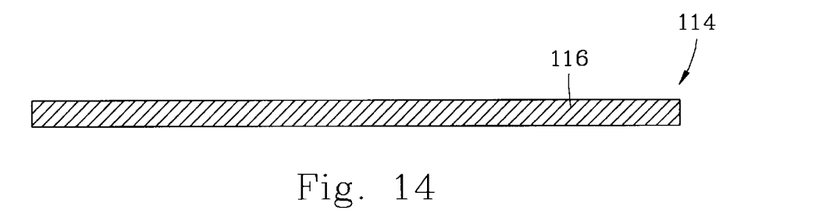
FIGS. 14–18 are cross-sectional views showing the steps for manufacturing the anti-counterfeit membrane of the anti-counterfeit card in accordance with a second embodiment of the present invention.

Due to the difficult of the imitation of a hologram, counterfeiting the card structure is very difficult which in turn prevents un-authorized duplication of the identification card 100. Although in the first embodiment illustrated in FIGS. 1–13, the anti-counterfeit membrane 12 includes a slipping agent layer 18 added to one side of the plastic layer 16 to enhance machine handling, it is not necessary in the present invention. For example, in a second embodiment in accordance with the present invention shown in FIGS. 14–18, the slipping agent layer is eliminated. In the second embodiment illustrated in FIGS. 14–18, same portions or members as those of the first embodiment of FIGS. 1–13 are designated with the same reference numerals with a prefix "1". For example, in FIG. 14, a base layer of the anti-counterfeit membrane is shown and designated at 114. The base layer 114 of the anti-counterfeit membrane in accordance with the second embodiment of the present invention comprises only a single layer of plastic material 116, such as PET, and has no slipping agent layer that is shown in the first embodiment.

Figure 15:
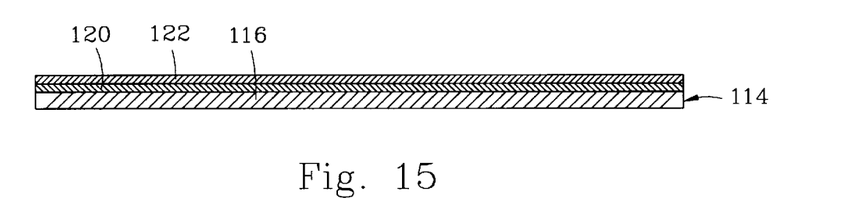
Figure 16:
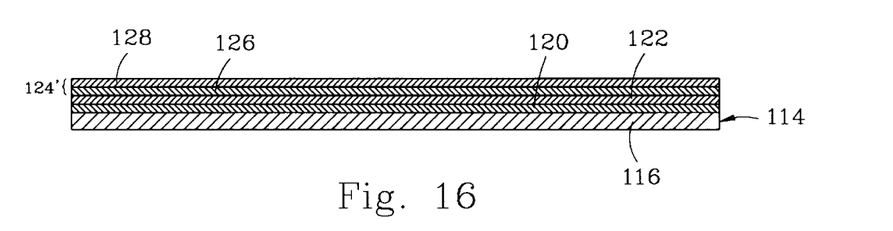

In accordance with the second embodiment of the present invention, the base layer 114 that is constituted by the single layer of plastic material 116 has a first layer of release 120 and a second layer of release 122 sequentially added to a surface thereof, as shown in FIG. 15. Thereafter, a hologram film 124 (see FIGS. 17 and 18) is formed on the outer surface of the second release layer 122 which is done by applying a layer of primer 126 on the second release layer 122 and followed by coating a transparent layer 128 thereon to define a plain film structure 124', as shown in FIG. 16. The transparent layer 128, as mentioned previously, is made of a suitable metallic or non-metallic material by means of any suitable technique, such as electroplating and vacuum deposition.

Figure 17:
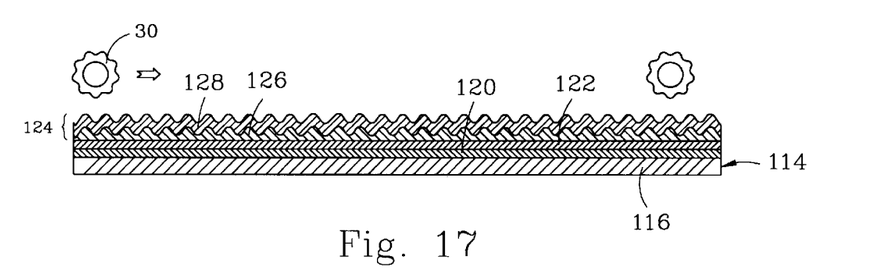
Figure 18:
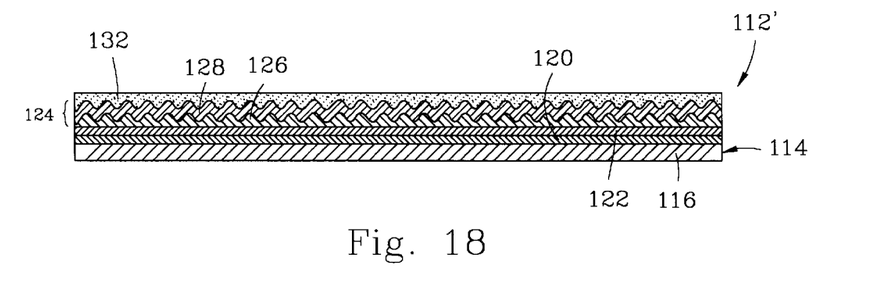

The roller 30 that has a serration formed on an outer surface thereof is driven over the plain film structure 124' to form the hologram serration on the plain film structure 124' and thus define the hologram film 124, as shown in FIG. 17. An adhesive 132 is then applied to the serrated surface of the hologram film 24 with the adhesive filling into the serration for forming an intermediate protective structure 112'. Thereafter, similar to the first embodiment, the intermediate protective structure 112' is attached to the substrate by means of the adhesive layer 132 thereof and a structure similar to that shown in FIG. 11 is completed with the only difference being that no slipping agent layer is present in the second embodiment. By peeling the base layer 114 along the release layers 120 and 122, the anti-counterfeit card structure in accordance with the second embodiment of the present invention is shown which is exactly the same as the first embodiment shown in FIG. 12.

In the first embodiment illustrated in FIGS. 1–13 and the second embodiment illustrated in FIGS. 14–18, the hologram film 24 or 124 is formed with a resin-based primer layer 26 or 126 and a transparent layer 28 or 128. In such a structure, since the resin-based primer layer 26 or 126 is in general "soft" and since the hologram serration is very fine, any external force applied thereto, such as being impacted by an object, may cause damage on the serration of the "soft" primer layer. In this respect, in accordance with the present invention, the transparent layer is made of a more rigid material which provides protection to the primer layer thereunder. However, since in a completed anti-counterfeit card in accordance with the present invention, the serrated side of the hologram film 24 or 124 is attached to the substrate 10 by means of the adhesive layer 32 or 132 and thus not directly exposed to any external force and since the primer layer 26 or 126 is also formed with hologram serration in the rolling process of the roller 30, the transparent layer 28 or 128 may not be needed. This is illustrated in a third embodiment of the present invention shown in FIGS. 19–22. In the third embodiment, the portions or members that are similar to those of the first embodiment are designated with the same reference numerals with a prefix "2".

Figure 19:
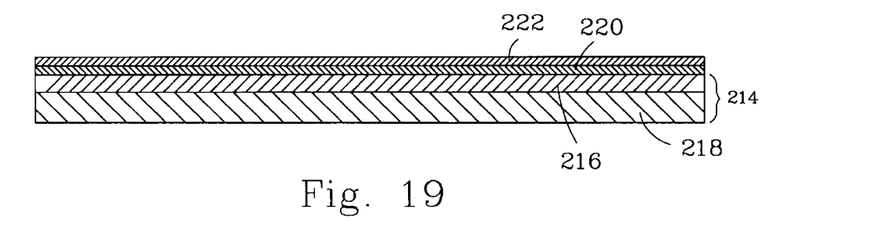
FIGS. 19–22 are cross-sectional views showing the steps for manufacturing the anti-counterfeit membrane of the anti-counterfeit card in accordance with a third embodiment of the present invention.
Figure 20:
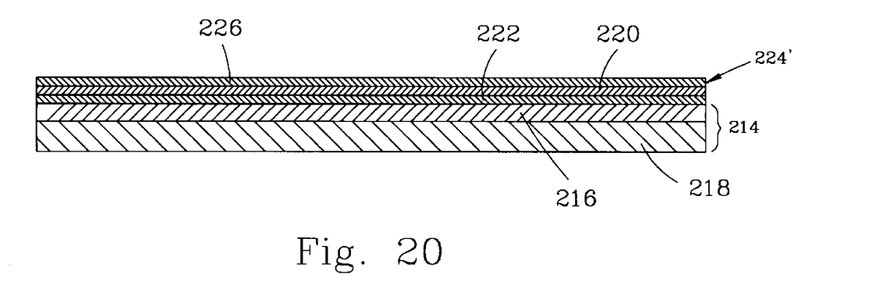

In FIG. 19, a base layer of the anti-counterfeit membrane in accordance with the third embodiment of the present invention which is designated with reference numeral 214, is shown, comprising a layer of plastic material 216, such as PET, with a layer of slipping agent 218 provided on one side thereof and a first layer of release 220 and a second layer of release 222 sequentially applied onto the opposite side of the plastic layer 216. Thereafter, a hologram film 224 (see FIGS. 21 and 22) is added to the outer surface of the second release layer 222. The hologram film 224 is constituted solely by a single primer layer 226 which is applied to the second release layer 222 to form an initially plain structure 224', as shown in FIG. 20.

Figure 21:
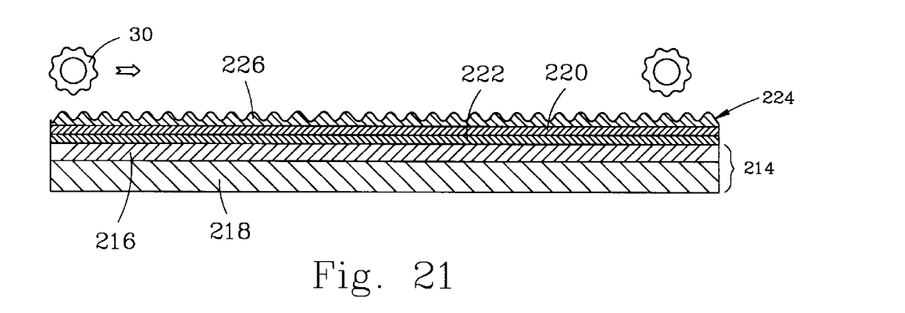
Figure 22:
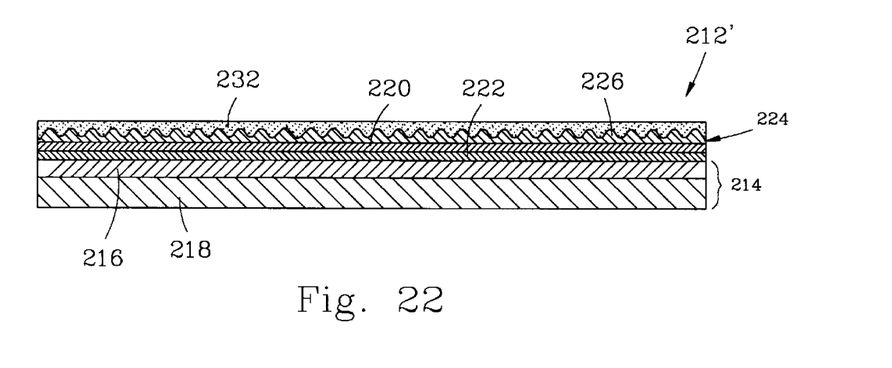

The roller 30 is then driven over the plain structure 224' to form hologram serration thereon so as to define the hologram film 224, as shown in FIG. 21. An adhesive layer 232 is then applied to the serrated surface of the hologram film 224 with the adhesive filling into the serration, see FIG. 22. This forms an intermediate protective structure 212' in accordance with the third embodiment of the present invention. Similar to the first embodiment, the intermediate protective structure 212' is then fixed to the card substrate by means of the adhesive layer 232 and a structure similar to that shown in FIG. 11 is thus formed with the only difference being that there is no transparent layer incorporated therein. The base layer 214 is then removed by peeling along the release layers 220 and 222 and an anti-counterfeit card structure similar to that shown in FIG. 12 is completed.

In respect of the structure of the substrate, in the first embodiment illustrated in FIG. 9, the substrate 10 has prints provided on one (the second surface 40) of the surfaces of the core layer 36, the first and second surface layers 44 and 46 being attached to the surfaces of the core layer 36 to cover and protect the prints on the core layer 36. The first and second surface layers 44 and 46 are made of transparent material and thus the prints on the core layer 36 are observable through the surface layers 44 and 46. Quite obviously, in the present invention, the prints may be provided on both the first and second surfaces 44 and 46 of the core layer 36. This is shown in a fourth embodiment illustrated in FIGS. 23–29. In the fourth embodiment, same portions or member as those of the first embodiment are designated with the same reference numerals with a prefix "3" to distinguish from each other.

Figure 23:
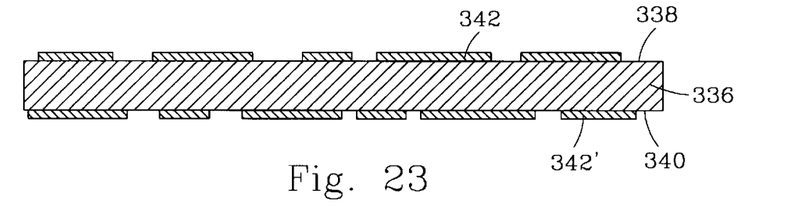
FIGS. 23–25 are cross-sectional views showing the steps for manufacturing the substrate of the anti-counterfeit card in accordance with a fourth embodiment of the present invention.
Figure 24:
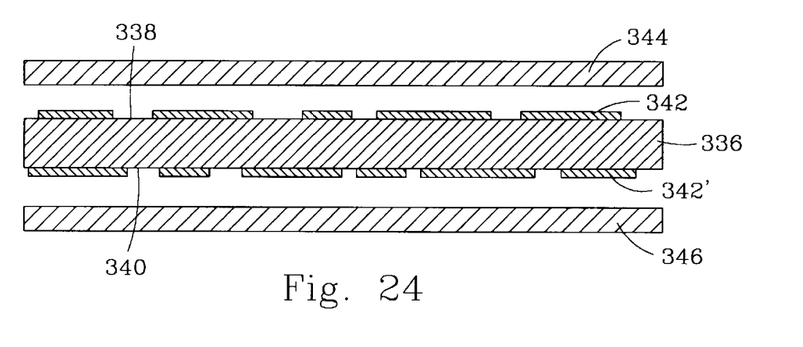
Figure 25:
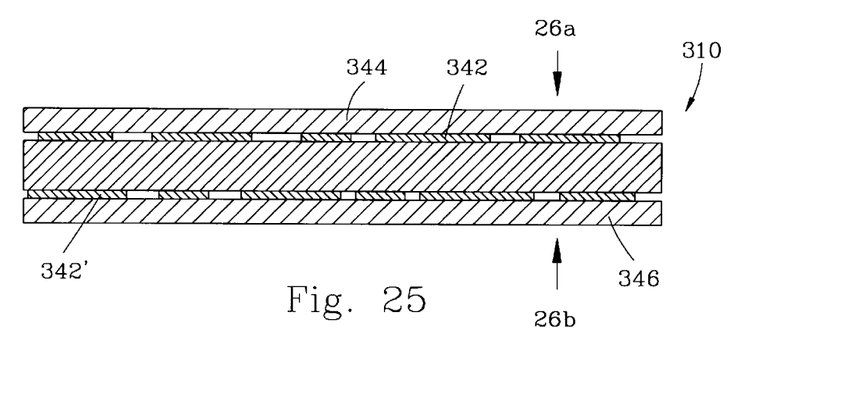

FIG. 25 shows a cross-sectional view of the card substrate made in accordance with the fourth embodiment of the present invention, which is designated with reference numeral 310. The fourth embodiment substrate 310 comprises a core layer 336, as shown in FIG. 23, which is made of for example a suitable material, such as the white PVC mentioned previously in the discussion of the first embodiment, having a thickness of for example 500 microns. The core layer 336 has a first surface 338 and a second surface 340 on both of which desired prints 342 and 342' are respectively provided. The prints 342 and 342' may be the same or may be different. The first and second surfaces 338 and 340 bearing the prints 342 and 342' are then covered by a first surface layer 344 and a second surface layer 346, both being preferably made of transparent or at least partially light transmittable material, as shown in FIG. 24 and this completes the substrate 310 of the fourth embodiment. The transparent material used to form the first and second surface layers 344 and 345 may comprise transparent plastics, such as transparent PVC, having a thickness identical to that of the first and second surface layers 44 and 46 of the first embodiment, namely the thickness thereof is 250 microns and this gives the substrate 310 a total thickness of 1,000 microns.

Figure 26A:
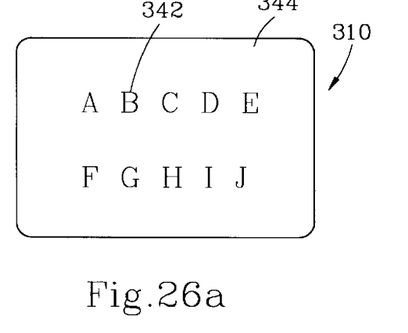
FIGS. 26a and 26b are plain views taken along arrows 26a and 26b of FIG. 25.
Figure 26B:
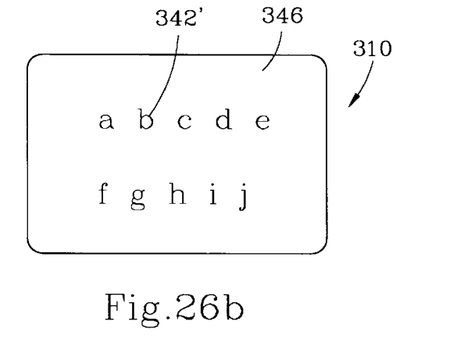
Figure 27:
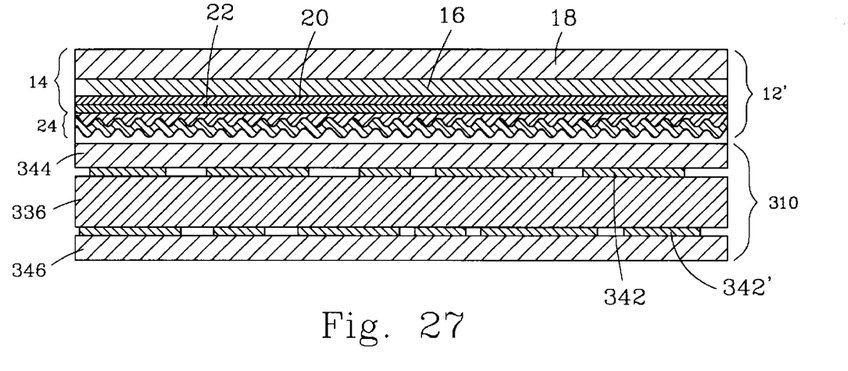
FIG. 27 is a cross-sectional view showing the anti-counterfeit card in accordance with the fourth embodiment of the present invention with the base layer of the anti-counterfeit membrane not yet been removed.

In the embodiment illustrated in FIGS. 25, the prints 342 and 342' provided on the first and second surface layers 338 and 340 of the core layer 336 are different from each other, as shown in FIGS. 26a and 26b which are plan views taken along arrows 26a and 26b in FIG. 25. The substrate 310 so formed may have an anti-counterfeit membrane 12 attached to either one of the two surface layers 338 and 340. In the embodiment illustrated, the substrate 310 comprises an intermediate protective structure, such as that of the first embodiment designated with reference numeral 12', fixed to the first surface 344 thereof, as shown in FIG. 27. Thereafter, similar to the first embodiment, the base layer 14 of the intermediate protective structure 12', including the slipping agent layer 18 and the plastic layer 16, is removed by peeling along the release layers 20 and/or 22 to complete the manufacturing of the card substrate in accordance with the fourth embodiment, which is designated at 400 in FIGS. 28 and 29. The intermediate protective structure 12' with the base layer 14 removed, forms the anti-counterfeit membrane 12 (see FIG. 28) for the anti-counterfeit card 400 of the fourth embodiment.

Figure 28:
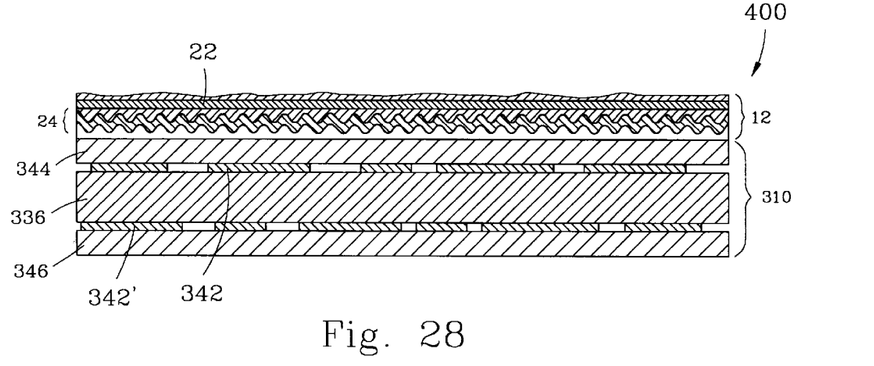
FIG. 28 is a cross-sectional view of the anti-counterfeit card of FIG. 27 with the base layer removed.
Figure 29:
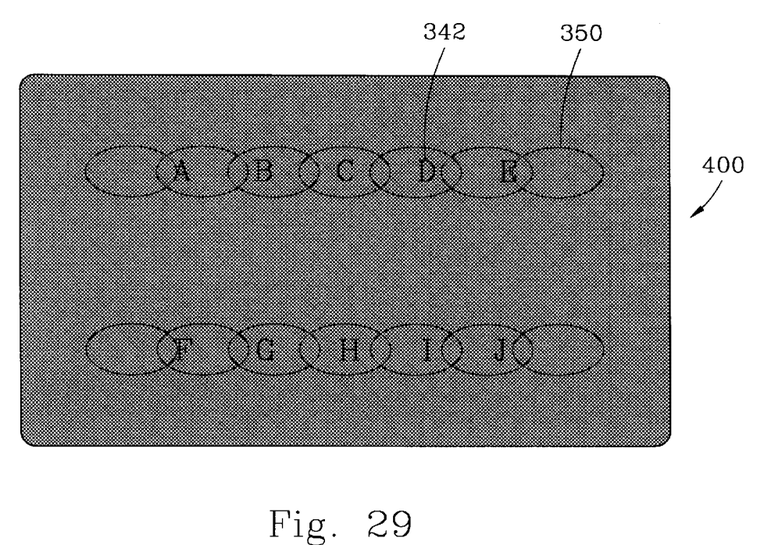
FIG. 29 is a plan view of anti-counterfeit card in accordance with the fourth embodiment of the present invention.

Due to the hologram serration incorporated in the hologram film 24 of the anti-counterfeit film 12, a stereo holographic image may be re-constructed by the hologram film 24 and the holographic image is designated at 350 in FIG. 28. The stereo holographic image 350 will be displayed together with the prints 342 that are provided on the first surface 338 of the core layer 336, as shown in FIG. 29.

Figure 30:
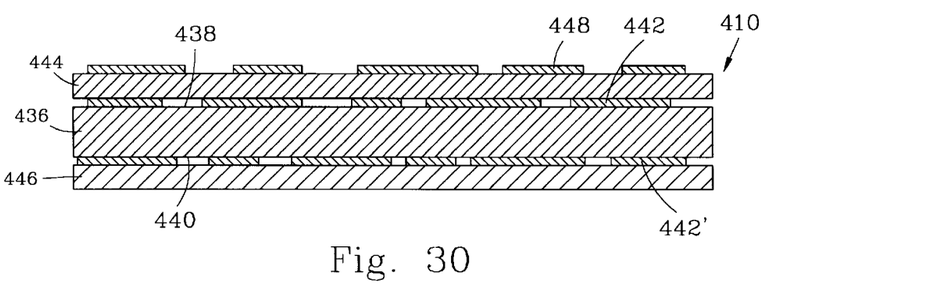
FIG. 30 is a cross-sectional view showing the substrate of the anti-counterfeit card in accordance with the fifth embodiment of the present invention.

It is also possible to add a second set of prints on either one of the first and second surfaces of the core layer, similar to that shown in the first embodiment. This is shown in a fifth embodiment illustrated in FIGS. 30–32, wherein same portions or members as those of the first embodiment are designated with the same reference numerals with a prefix "4". In the fifth embodiment illustrated in FIG. 30, a card substrate, designated at 410, comprises a metallic or non-metallic core layer 436 which may be made of for example white PVC plate with a thickness of 500 microns. The core layer 436 has a first surface 438 and a second surface 440, each having prints 442 and 442' respectively provided thereon. To protect the prints 442 and 442' on the first and second surfaces 438 and 440, similar to the fourth embodiment discussed previously, a first surface layer 444 and a second surface layer 446, both being transparent, are respectively attached and covering the first and second surfaces 438 and 440 of the core layer 436. A second set of prints 448 are then provided on the outer surface of for example the first surface layer 444. This provides the substrate 410 shown in FIG. 30. The first and second surface layers 444 and 446 may be made of transparent plastics, such as transparent PVC, and has a thickness of 250 microns, identical to that of the first and second surface layers 44 and 46 of the first embodiment, giving the substrate 410 a total thickness of 1,000 microns.

Then, an intermediate protective structure 12' as that used in the first embodiment may be attached to at least one of the first and second surfaces 444 and 446 of the substrate 410 by means of the adhesive layer 32 of the intermediate protective structure 12'. In this example, the intermediate protective structure 12' is only attached to the first surface 444 and not the second surface 446, see FIG. 31. The base layer 14 of the intermediate protective structure 12' is then removed by peeling along the first and second release layers 20 so as to form the anti-counterfeit card 500 of the fifth embodiment of the present invention. FIG. 32 shows a plan view of the card 500, wherein a stereo holographic image indicated by reference numeral 450 caused by the hologram serration of the hologram film 24 incorporated in the intermediate protective structure 12', the prints 442 on the first surface 438 of the core layer 436 and the second prints 448 on the outer surface of the first surface layer 444 are simultaneously observable. This allows a variety of combinations of the prints and image and thus showing different appearance of the card 500. To avoid visual interference, the prints 442 on the first surface 438 of the core layer 436, the second prints 448 on the first surface layer 444 and the holographic image 450 have to be carefully arranged in positional relationship.

The card substrate 10, 310 or 410 of the above described embodiments is made in a piece by piece basis and the mass production thereof, as mentioned previously, is done by stacking the cards to be pressurized and heated at the same time so as to form a number of piece of the substrate in one operation cycle. The anti-counterfeit membrane may be manufactured separately and preferably in a standardized specification so that a few sizes of the anti-counterfeit membrane may be fit with different pieces of the substrate having different information or marks thereon. This allows the card to be fit for different users and different conditions.

Another way of mass production of the card in accordance with the present invention is shown in a sixth embodiment of the present invention which is illustrated in FIGS. 33–37. In the sixth embodiment, a large piece of card, designated at 600 (see FIGS. 36 and 37) is adapted for making a number of smaller-sized pieces of substrate by cutting into the smaller size. In the sixth embodiment, portions or members similar to those of the first embodiment are designated with the same reference numerals with a prefix of "5". The large piece card 600 comprises a substrate 510, see FIG. 36, having an anti-counterfeit membrane 512 fixed to one side thereof.

Figure 33:
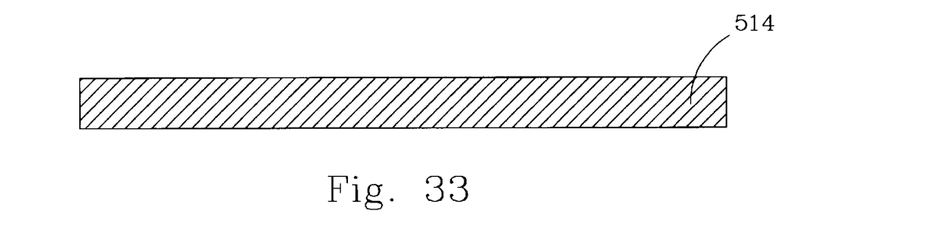
FIGS. 33–36 are cross-sectional views showing the steps for manufacturing the anti-counterfeit card in accordance with a sixth embodiment of the present invention.
Figure 34:
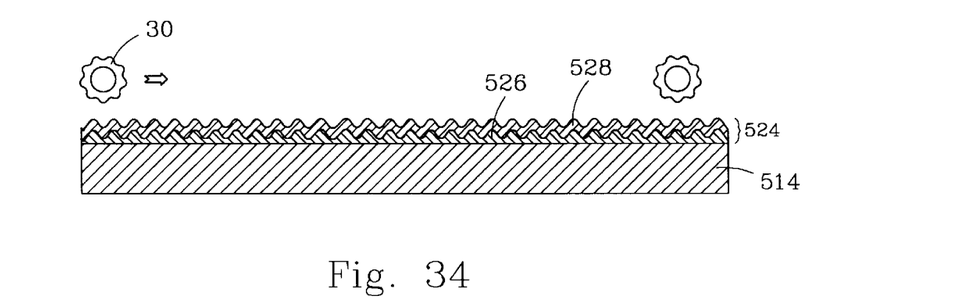
Figure 35:
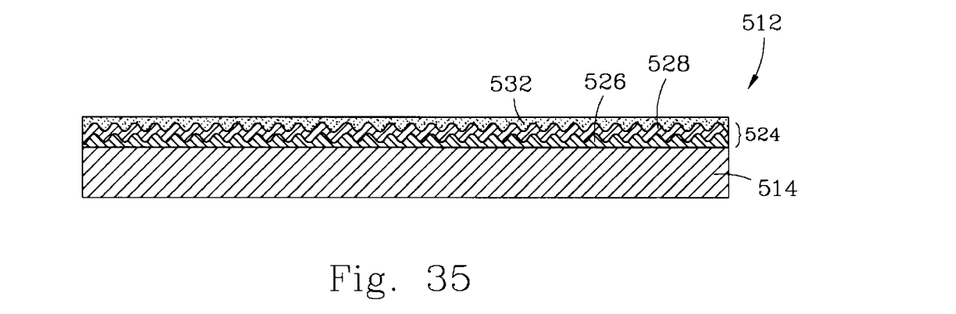
Figure 36:
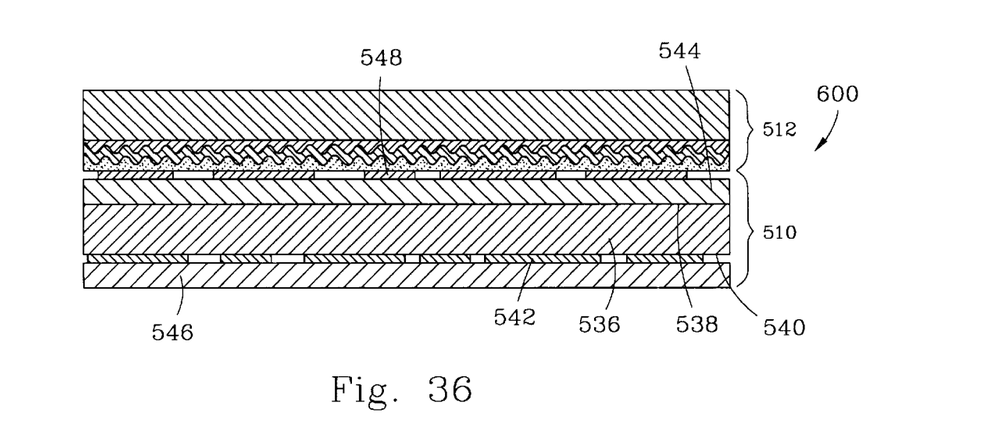

The anti-counterfeit membrane 512 comprises a metallic or non-metallic base layer 514, as shown in FIG. 33, which may be made of a single material, or may be composed by a number of different materials. In this example, the base layer 514 is made of a single piece of plastic plate, such as a PVC plate of 50 micron thickness, having a hologram film 524 (see FIG. 34) attached to one side thereof. The hologram film 524 is comprised of a primer layer 526 and a transparent layer 528 which is done by first applying the primer 526 to the base layer 514 and the coating the transparent layer 528 thereon by means of for example electroplating and vacuum deposition. A roller 30 having a serrated pattern thereon is then driven over the transparent layer 528 to form a hologram serration thereon. In this respect, the serrated pattern on the roller 30 is exactly complementary to the hologram serration formed on the hologram film 524. Thereafter, an adhesive layer 532 is applied to the serration of the hologram film 524, as shown in FIG. 35. The adhesive 532 allows the anti-counterfeit membrane 512 to be attached and fixed to the substrate 510, as shown in FIG. 36.

Figure 37:
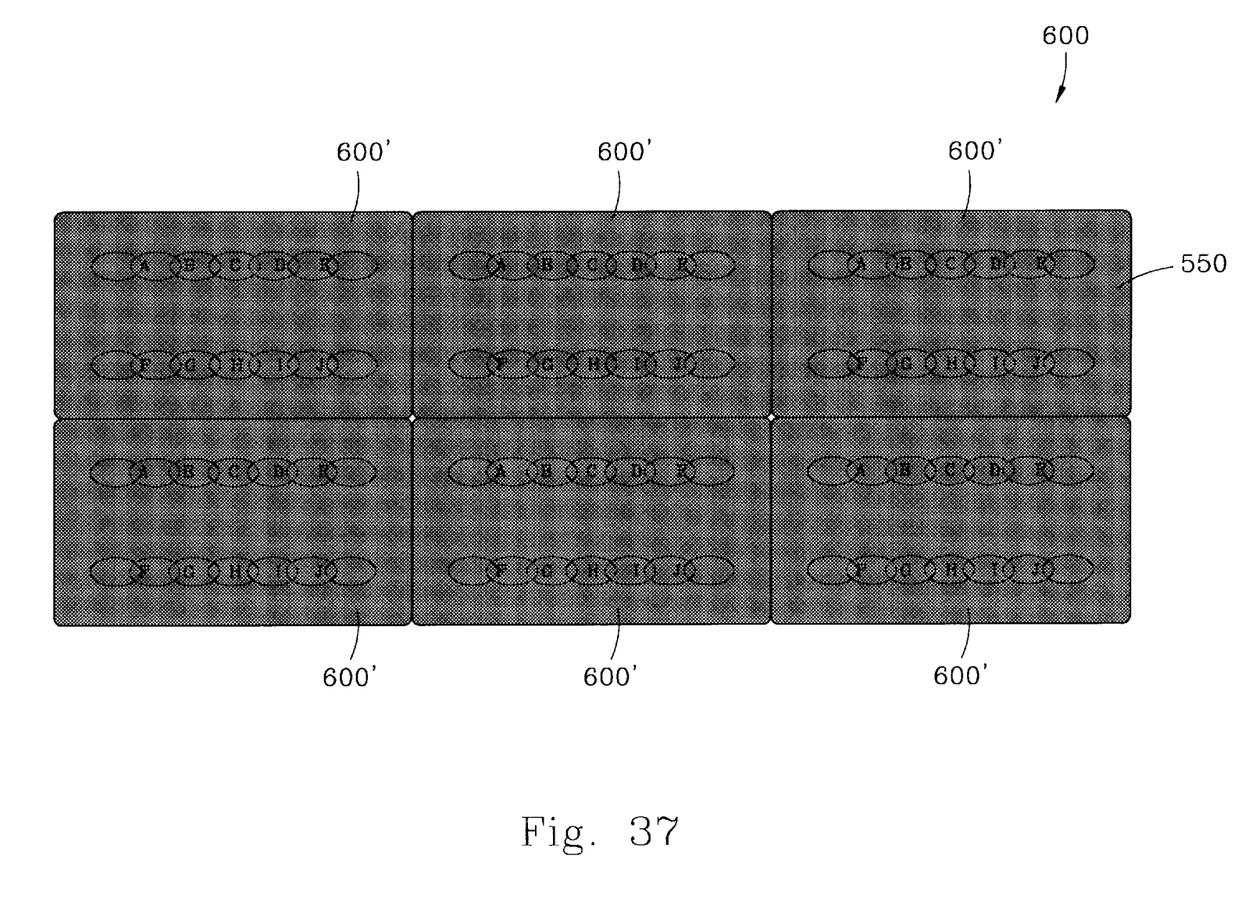
FIG. 37 is a plan view showing the anti-counterfeit card in accordance with the sixth embodiment of the present invention which has a surface area covering six smaller-sized cards.

The anti-counterfeit membrane 512 so formed incorporates a hologram film 524 therein which allows re-construction of a stereo holographic image 550, as shown in FIG. 37. This provides an effect similar to a "water mark" commonly seen in paper sheet.

In this embodiment, the substrate 510 has a structure identical to that of the substrate 10 of the first embodiment, namely the substrate 510 comprises a metallic or non-metallic core layer 536 having a first surface 538 and a second surface 540. A first set of prints (characters, marks or the like) 542 are provided on the second surface 540 of the core layer 536. A first surface layer 544 and a second surface layer 546 are respectively mounted to the first and second surfaces 538 and 540 of the core layer 536 to shield the first and second surfaces 538 and 540. Further, a second set of prints (characters, marks or the like) 548 are provided on the outer surface of the first surface layer 544. In this example, the second set of prints 548 are represented by capital English letters, FIG. 37, as a demonstration example.

In the sixth embodiment, the card 600 may have an area that is large enough to be divided into a number of smaller but desired size of cards 600', see FIG. 37, wherein the card 600 is divided into six smaller cards 600'. Each of the smaller-sized cards 600' may contain the same information thereon, such as that shown in FIG. 37 or alternatively, the information thereon may be different from each other. By properly cutting the card 600, a number of smaller-sized cards 600' are formed. This provides an alternative way for mass production of the anti-counterfeit cards of the present invention.

Similar to the embodiments discussed previously, the card that contains a number of smaller-sized cards may have different prints on different surfaces thereof. Two examples of providing prints on different surfaces of the card are respectively shown in a seventh embodiment illustrated in FIGS. 38–41 and an eighth embodiment illustrated in FIG. 42–45. The cards of the seventh embodiment and the eighth embodiment have a structure essentially the same as that of the sixth embodiment, but having prints on different surfaces thereof. In the seventh and eighth embodiments of the present invention, portions or members that are similar to those of the sixth embodiment are designated with the same reference numerals with the prefix "5" in the six embodiment replaced by "6" (the seventh embodiment) and "7" (the eighth embodiment).

Figure 38:
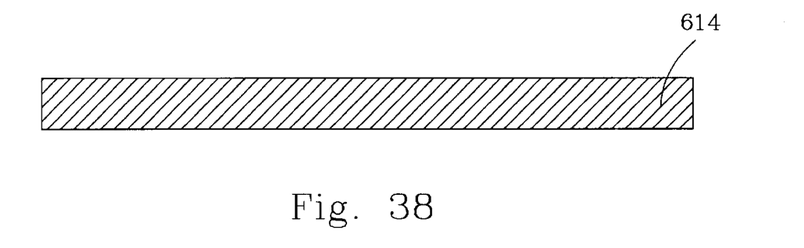
FIGS. 38–41 are cross-sectional views showing the steps for manufacturing the anti-counterfeit card in accordance with a seventh embodiment of the present invention.
Figure 39:
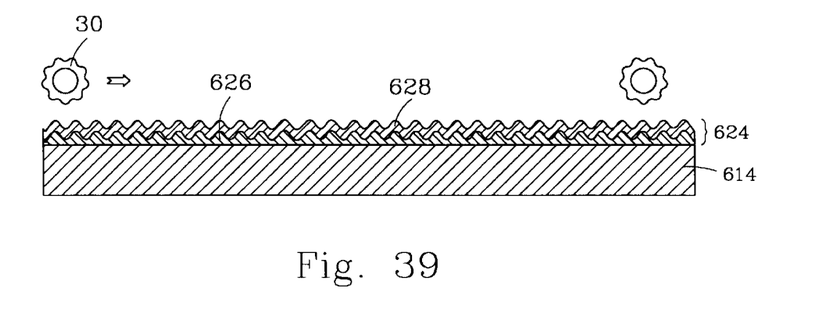
Figure 40:
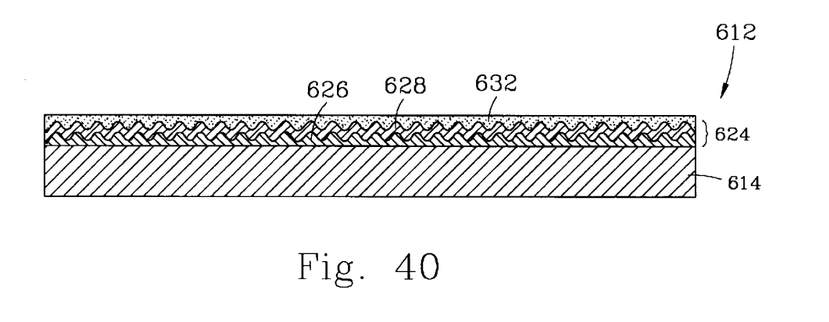
Figure 41:
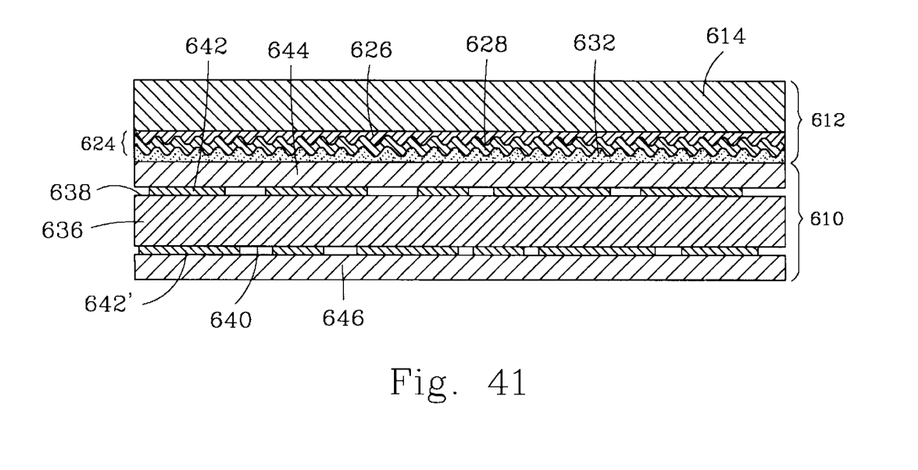

In other words, the card of the seventh embodiment of the present invention comprises an anti-counterfeit membrane 612, see FIGS. 40 and 41, which comprises a metallic or non-metallic base layer 614, as shown in FIG. 38, which is made of for example a 50 micron thick PVC plate, with a hologram film 624 (see FIG. 39) attached to one side thereof. The hologram film 624 comprises a primer layer 626 which is applied to the side of the base layer 614 and a transparent layer 628 which is coated on the primer layer 626 by means of for example electroplating or vacuum deposition. A roller 30 having a serrated pattern on an outer surface thereof is driven over the hologram film 624 to form hologram serration thereon. An adhesive layer 632 is then applied to the serrated surface of the transparent layer 628, as shown in FIG. 40, to allow the anti-counterfeit membrane 612 to be attached to the substrate 610, see FIG. 41.

The substrate 610 of the seventh embodiment has a structure similar to the substrate 310 of the fourth embodiment shown in FIG. 25. The substrate 610 comprises a core layer 636, having a first surface 638 and a second surface 640, each having prints 642 and 642' provided thereon. A first surface layer 644 and a second surface 646 are respectively attached to the first surface 638 and the second surface 640 of the core layer 636 to shield the surfaces 638 and 640.

Figure 42:
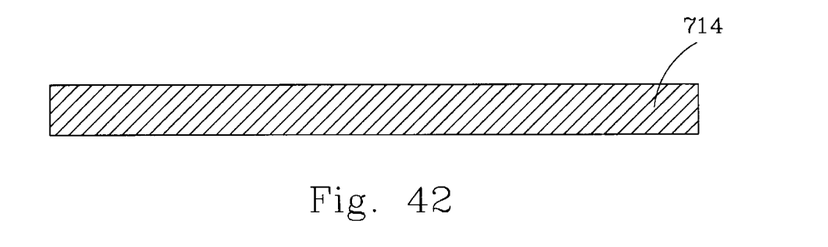
FIGS. 42–45 are cross-sectional views showing the steps for manufacturing the anti-counterfeit card in accordance with an eighth embodiment of the present invention.
Figure 43:
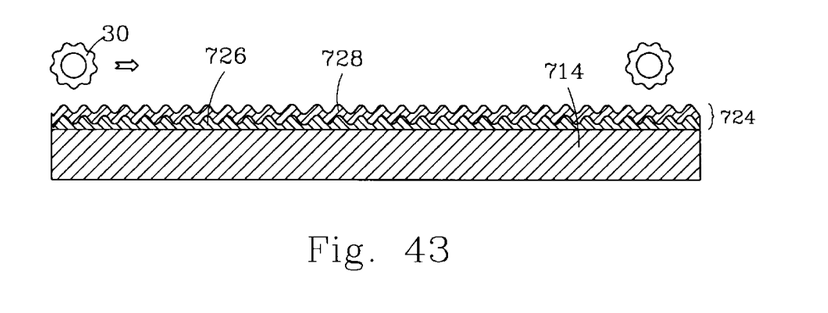
Figure 44:
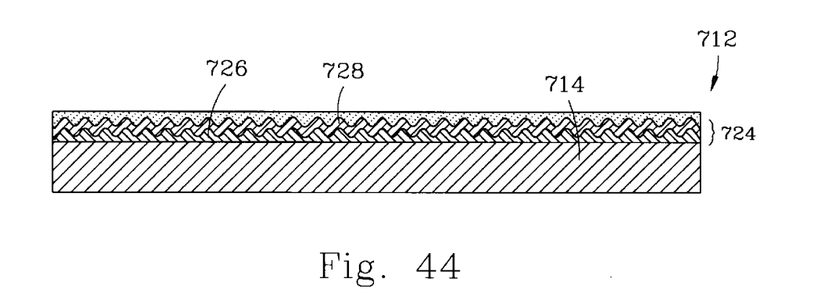
Figure 45:
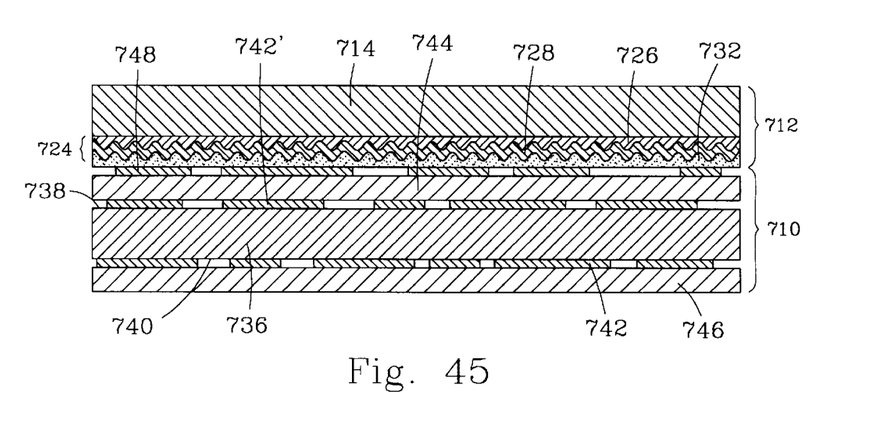

Similarly, the card of the eighth embodiment of the present invention comprises an anti-counterfeit membrane 712, see FIGS. 44 and 45, which comprises a metallic or non-metallic base layer 714, as shown in FIG. 42, which is made of for example a 50 micron thick PVC plate, with a hologram film 724 (see FIG. 44) attached to one side thereof. The hologram film 724 comprises a primer layer 726 which is applied to the side of the base layer 714 and a transparent layer 728 which is coated on the primer layer 726 by means of for example electroplating or vacuum deposition. A roller 30 having a serrated pattern on an outer surface thereof is driven over the hologram film 724 to form hologram serration thereon. An adhesive layer 732 is then applied to the serrated surface of the transparent layer 728, as shown in FIG. 44, to allow the anti-counterfeit membrane 712 to be attached to the substrate 710, see FIG. 45.

Figure 31:
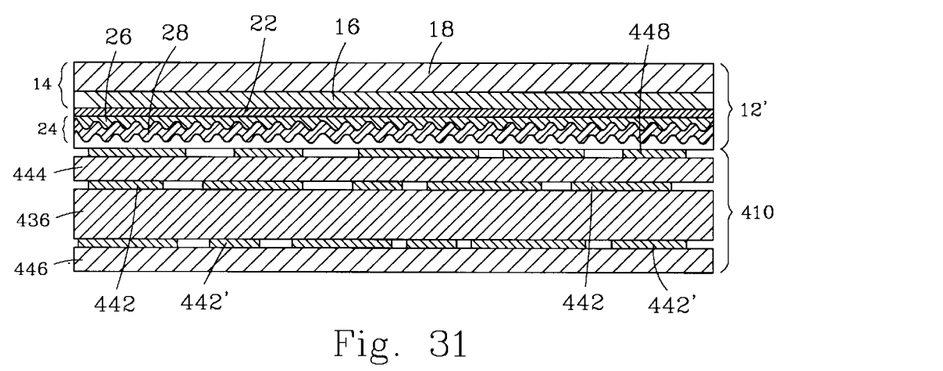
FIG. 31 is a cross-sectional view of the anti-counterfeit card of the fifth embodiment of the present invention with the base layer not been removed.
Figure 32:
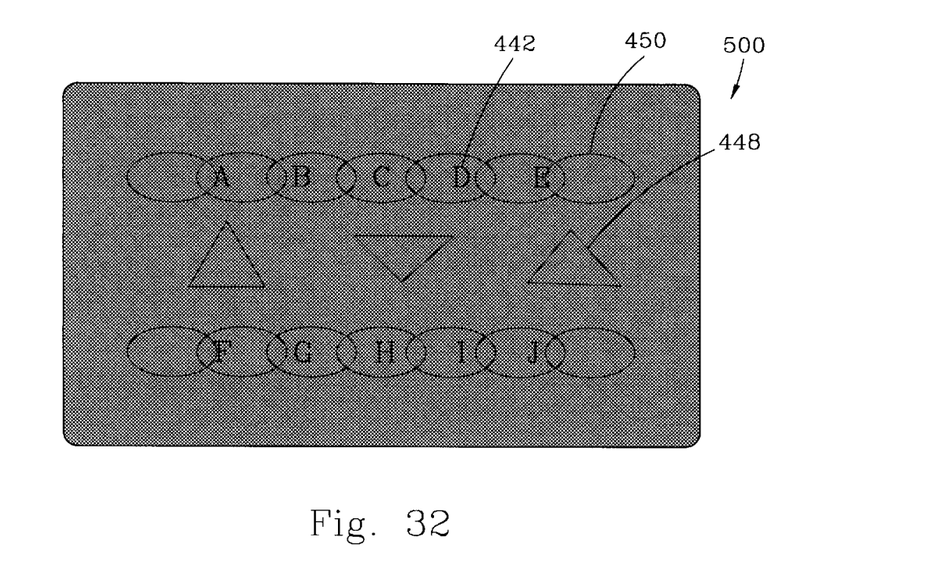
FIG. 32 is a plan view of anti-counterfeit card in accordance with the fifth embodiment of the present invention.

The substrate 710 of the eighth embodiment has a structure similar to the substrate 410 of the fifth embodiment shown in FIG. 31. The substrate 710 comprises a core layer 736, having a first surface 738 and a second surface 740, each having prints 742 and 742' provided thereon. A first surface layer 744 and a second surface 746 are respectively attached to the first surface 738 and the second surface 740 of the core layer 736 to shield the surfaces 738 and 740. A second set of prints 748 are provided on the outer surface of the first surface layer 744.

It is apparent that although the present invention is illustrated with the description of the preferred embodiments, it is contemplated that there may be changes and modifications in the described embodiments that can be carried out without departing from the scope of the invention which is intended to be limited only by the appended claims.

What is claimed is:

1. A method for manufacturing an anti-counterfeit card, comprising the steps of:
   providing a substrate having a predetermined surface area;
   providing an anti-counterfeit membrane which comprises a hologram film having a hologram serration for re-construction of a stereo holgralphic image; and
   attaching the anti-counterfeit membrane to the substrate to form the anti-counterfeit card;
   wherein the step of providing the substrate comprises:
   providing a core layer having a first surface and an opposite second surface;
   selectively providing prints on the first and second surfaces; and
   providing a first surface layers and a second surface layer and respectively attaching the first surface layer and the second surface layer to the first surface and the second surface;
   further wherein the first and second surface layers are attached to the first and second surfaces of the core layer by means of pressurizing and heating, which is done by stacking a plurality of pieces of the substrate over each other to be pressurized at the same time while being heated so as to form a plurality of pieces of the substrate at one pressuring and heating operation.

2. The method as claimed in claim 1, further comprising a step of cutting the predetermined surface area of the anti-counterfeit card into smaller and desired size.

3. The method as claimed in claim 1, further comprising the step of selectively providing prints on an outer surface of the first and second surface layers.

4. The method as claimed in claim 1, wherein the step of providing the anti-counterfeit membrane comprises:
   providing a base layer;
   coating a layer of release on a surface of the base layer;
   attaching a hologram film blank layer to the release layer; and
   driving a roller that has an outer surface on which a serrated pattern complementary to the hologram serration to roll over the hologram film blank layer to form the hologram serration thereon and thus defining the hologram film.

5. The method as claimed in claim 4, wherein the step of attaching the anti-counterfeit membrane to the substrate comprises:
   applying an adhesive on the hologram film; and
   adhesively fixing the anti-counterfeit membrane to the substrate by means of the adhesive.

6. The method as claimed in claim 5, further comprising a step of removing the base layer away from the anti-counterfeit membrane by peeling along the release layer.

7. The method as claimed in claim 4, wherein the anti-counterfeit membrane comprises two layers of release sequentially coated on the base layer.

8. The method as claimed in claim 4, wherein the hologram film blank layer comprises a layer of primer coated on the release layer.

9. The method as claimed in claim 8, wherein the hologram film blank layer further comprises a transparent coating provided on the primer layer.

* * * * *